United States Patent [19]

Lerat

[11] 4,169,789

[45] Oct. 2, 1979

[54] PROCESS AND APPARATUS FOR PURIFYING SEA WATER BY REVERSE OSMOSIS

[75] Inventor: Hénry Lerat, St. Cloud, France

[73] Assignee: Permo SA, Rueil Malmaison, France

[21] Appl. No.: 911,959

[22] Filed: Jun. 1, 1978

[51] Int. Cl.$^2$ .......................... B01D 13/00; C02B 1/82
[52] U.S. Cl. ................................ 210/22 D; 210/23 H; 210/73 R; 210/81; 210/257.2; 210/259; 210/321 R; 210/433 M
[58] Field of Search ................. 210/23, 23 H, 73 R, 210/79, 110, 137, 257 M, 259, 295, 321 R, 321 A, 332, 335, 433 M, 339, 81, 323 R, 323 T

[56] References Cited

U.S. PATENT DOCUMENTS

| | | | |
|---|---|---|---|
| 2,854,143 | 9/1958 | Novak | 210/335 |
| 3,355,382 | 11/1967 | Huntington | 210/321 R |
| 3,608,730 | 9/1971 | Blaha | 210/321 R |
| 3,637,081 | 1/1972 | Bradley | 210/110 |
| 3,640,395 | 2/1972 | Kinney | 210/334 |
| 3,758,405 | 9/1973 | Fremont | 210/321 R |
| 3,940,336 | 2/1976 | Maievicz et al. | 210/81 |

FOREIGN PATENT DOCUMENTS

| | | | |
|---|---|---|---|
| 2180436 | 3/1973 | France | 210/257 M |
| 2338901 | 8/1977 | France | 210/257 M |

OTHER PUBLICATIONS

"Off Shore Sea Water Reverse Osmosis Plants" Desalination, 19 (1976) pp. 201–210.
"Reverse Osmosis at Coalinga, California" J. W. McCutchan et al. Jour. AWWA, Jun. 1970, pp. 346–353.

Primary Examiner—Charles N. Hart
Assistant Examiner—David R. Sadowski
Attorney, Agent, or Firm—Wenderoth, Lind & Ponack

[57] ABSTRACT

Sea water is purified by reverse osmosis in an offshore installation wherein sea water is withdrawn from the sea by a low pressure pump and passed through plural-stage physical filters having decreasing degrees of porosity to remove suspended particles and colloids from the sea water. The thus filtered sea water is then fed by a high pressure pump, at a controlled pressure above the osmotic pressure of the sea water to a reverse osmosis module, wherein a portion of the sea water permeates through a semi-permeable membrane of the module to form purified potable water, and wherein the remaining sea water, having the dissolved salt concentration thereof increased, is discharged back to the sea. The reverse osmosis module is operated such that the conversion level, measured in percent and equal to the volume of purified water divided by the volume of sea water fed to the module, is maintained below a maximum value to prevent the formation on the semi-permeable membrane of the module of sulfates and carbonates.

38 Claims, 2 Drawing Figures

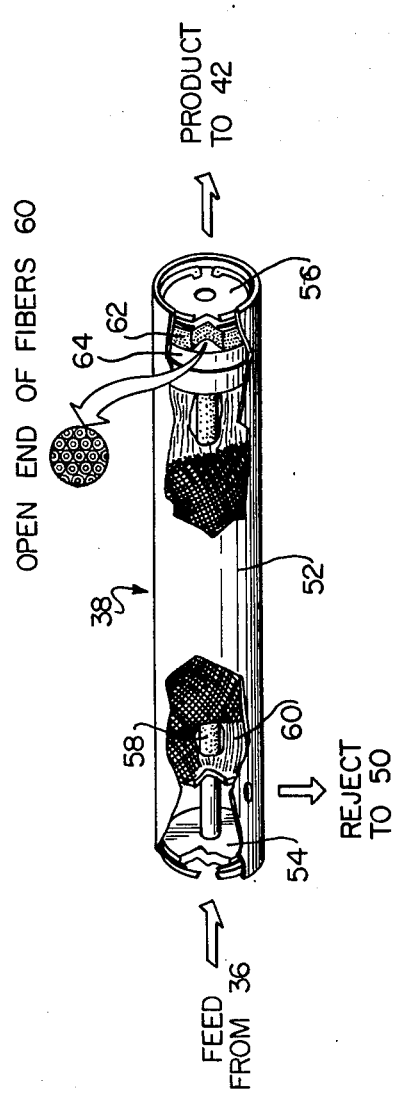

PROCESS AND APPARATUS FOR PURIFYING SEA WATER BY REVERSE OSMOSIS

BACKGROUND OF THE INVENTION

The present invention relates to a process and apparatus for treating sea water to provide purified potable water.

More particularly, the present invention relates to such a process and apparatus for purifying sea water by means of the phenomenon of reverse osmosis.

For all practical purposes, the supply of fresh potable drinking water to offshore marine structures, such as platforms, ships, barges, weather ships, etc., has been achieved in only two ways, i.e. sea water distillation units and storage tanks.

Sea water distillation units however have the inherent disadvantages of requiring high energy consumption, of being subject to scaling and corrosion, of requiring considerable maintenance, and of not being able to operate in heavy or severe weather conditions.

Furthermore, the supply of fresh drinking water in storage tanks requires that the crew of an offshore marine structure be dependent on outside means of supply. Thus, depending on the geographical location of the offshore structure, fresh water must be supplied by barges, helicopters, etc., and thus the quality of the supplied drinking water will be dependent upon the quality of water in the geographical land supply area. Furthermore, during heavy and severe weather it is difficult to bring such fresh water to the marine structure.

Furthermore, it has been known to purify water by the phenomenon of reverse osmosis. The use of reverse osmosis to purify sea water has particularly been employed since the development by Du Pont of an asymmetrical fiber formed of aromatic polyamids which are naturally stable, which are non-biodegradable, and which can be operated in waters having pH values of from 5 to 9. Such fibers are marketed by Du Pont as B-10 fibers and are particularly useful as a semi-permeable membrane through which sea water may be purified by the phenomenon of reverse osmosis.

However, systems for purifying sea water by reverse osmosis have generally required the necessity of providing a complex pretreatment installation for pretreating the sea water before it contacts the semi-permeable membrane of the reverse osmosis purification unit. Such pretreatment installations have conventionally involved the operations of flocculation, clarification, chlorination and dechlorination, and proportional acidification or addition or an anti-scale agent.

Such pretreatment operations are virtually unusable in offshore marine structures, where space is restricted, where the handling of acid and dangerous chemical reagents is extremely hazardous, and where it is difficult to provide the complex maintenance facilities necessary for such pretreatment operations.

In an attempt to resolve the above problems, a process and apparatus as disclosed in French Patent Application No. 76 02471, published on Aug. 19, 1977 as Publication No. 2,338,901, provided a system whereby sea water could be purified on offshore marine structures by the phenomenon of reverse osmosis to obtain purified potable water, and wherein such system did not require the use of a chemical pretreatment. However, the process and apparatus of such French publication still had certain inherent operational disadvantages. More particularly, although the pretreatment of such French publication is a physical pretreatment, as opposed to a chemical pretreatment, the pretreatment obtained thereby is not entirely satisfactory. Further, the process of the French publication does not entirely eliminate the formation of precipitates, particularly sulfates and carbonates, and more specifically calcium carbonate, on the semi-permeable membrane of the reverse osmosis unit. Even further, during shutdown of the system of the French publication, there occurs the danger of the growth of marine microorganisms in the system, and it is also necessary to clean the system of the French publication at fairly regular intervals.

SUMMARY OF THE INVENTION

With the above discussion in mind, it is the primary object of the present invention to provide a novel and improved process and apparatus for purifying sea water by reverse osmosis to form purified potable water.

It is a further object of the present invention to provide such a process and apparatus on an offshore marine structure, without the need for a chemical pretreatment of the sea water.

It is an even further object of the present invention to provide such a process and apparatus which controls and substantially avoids the clogging of the semi-permeable membrane of the reverse osmosis unit.

It is a still further object of the present invention to provide such a process and apparatus whereby it is possible to control and substantially avoid the formation on the semi-permeable membrane of the reverse osmosis unit of precipitated sulfates and carbonates, and particularly calcium carbonate.

It is a yet further object of the present invention to provide such a process and apparatus which is an improvement of the invention disclosed in the above-noted French Publication No. 2 338 901, and the disclosure of such publication is herein incorporated by reference.

The above objects are achieved in accordance with the present invention by providing a process and apparatus for purifying sea water by reverse osmosis to form purified potable water, wherein sea water is withdrawn from the sea by a low pressure pump and is passed at a low pressure through plural-stage physical filters having decreasing degrees of porosity, without the use of any chemical pretreatment, thereby filtering suspended particles and colloids from the sea water. The thus filtered sea water is then passed by a high pressure pump, at a pressure higher than the osmotic pressure of the sea water, into an otherwise known and conventional permeator or reverse osmosis unit or module including at least one semi-permeable membrane having an upstream side and a downstream side. The sea water is fed into the upstream side of the semi-permeable membrane, thereby causing a first volume portion of the sea water to pass by reverse osmosis through the membrane to the downstream side of the membrane. The membrane prevents the passage therethrough of substantially all of the dissolved salts in the first volume portion, thereby removing the dissolved salts from the first volume portion and forming the first volume portion into purified potable water which is removed from the module on the downstream side of the membrane. The removed dissolved salts are added to a second volume portion of the sea water remaining on the upstream side of the membrane, thus increasing the dissolved salt concentration of such second volume portion and forming a reject flow which is removed from the module as reject which is returned to the sea. The reverse osmosis module is operated to control the conversion level of the module, measured in percent and equal to the volume of purified water divided by the volume of sea water fed to the module, below a predetermined maximum value to prevent the formation on the semi-permeable membrane of sulfates and carbonates.

The low pressure pump is operated at a pressure range of from 2 to 4 bars, and preferably 3 bars.

The pretreatment installation including plural-stage physical filters comprises four separate physical filters, and the sea water is passed seriatim through such four physical filters. The first filter has a porosity of from 75 to 150 microns, and preferably 100 microns. The second filter has a porosity of from 10 to 30 microns, and preferably 20 microns. The third filter has a porosity of approximately 5 microns. The fourth filter has a porosity of approximately 1 to 2 microns, and preferably 1 micron.

The high pressure pump operates at approximately from 45 to 60 bars.

The conversion level is controlled to be from approximately 5 to 11%, and preferably approximately 10%. The conversion level is controlled by adjusting the pressure of the sea water fed into the feed inlet of the reverse osmosis module, and further by adjusting the pressure of the reject flow removed from the reverse osmosis module.

In accordance with a further feature of the present invention, when the sea water contains radioactive contaminants, such contaminants are removed from the first volume portion of the sea water by passage thereof through the membrane. Therefore, a further embodiment of the present invention comprises the radioactive decontamination of sea water by the phenomenon of reverse osmosis purification.

In accordance with a further feature of the present invention, upon each shutdown of the system, the entire system is flushed with purified potable water which has previously been purified by the reverse osmosis module. Further, during the entire length of shutdown of the system, the system is maintained entirely filled with such purified potable water. Due to the fact that such purified potable water has a very low osmotic pressure, such purified potable water forms a medium which is biocidal to and which prevents the growth of marine microorganisms within the system during the shutdown period thereof.

In accordance with an even further feature of the present invention, upon each start-up of the system, the system is sequentially operated to discharge the initial volume of sea water withdrawn from the sea through the low pressure pump, to then discharge the initial volume of the sea water passed through the plural physical filters, and to then discharge the initial volume of water purified by the reverse osmosis module.

By the above features of the process and apparatus of the present invention it is possible to provide a system which is capable of purifying sea water on offshore marine structures by reverse osmosis, and without the need for the provision of a chemical pretreatment installation. It is further possible to provide a system whereby the reverse osmosis unit or module may be operated for relatively long periods of time without the need for cleaning of the module.

BRIEF DESCRIPTION OF THE DRAWINGS

Other objects, features and advantages of the present invention will become apparent from the following detailed description of a preferred embodiment thereof, with reference to the attached drawings, wherein:

FIG. 2 is a perspective view, with portions broken away, of one type of reverse osmosis unit or module which may be employed in the process and apparatus of the present invention.

DETAILED DESCRIPTION OF THE INVENTION

Figure 1:
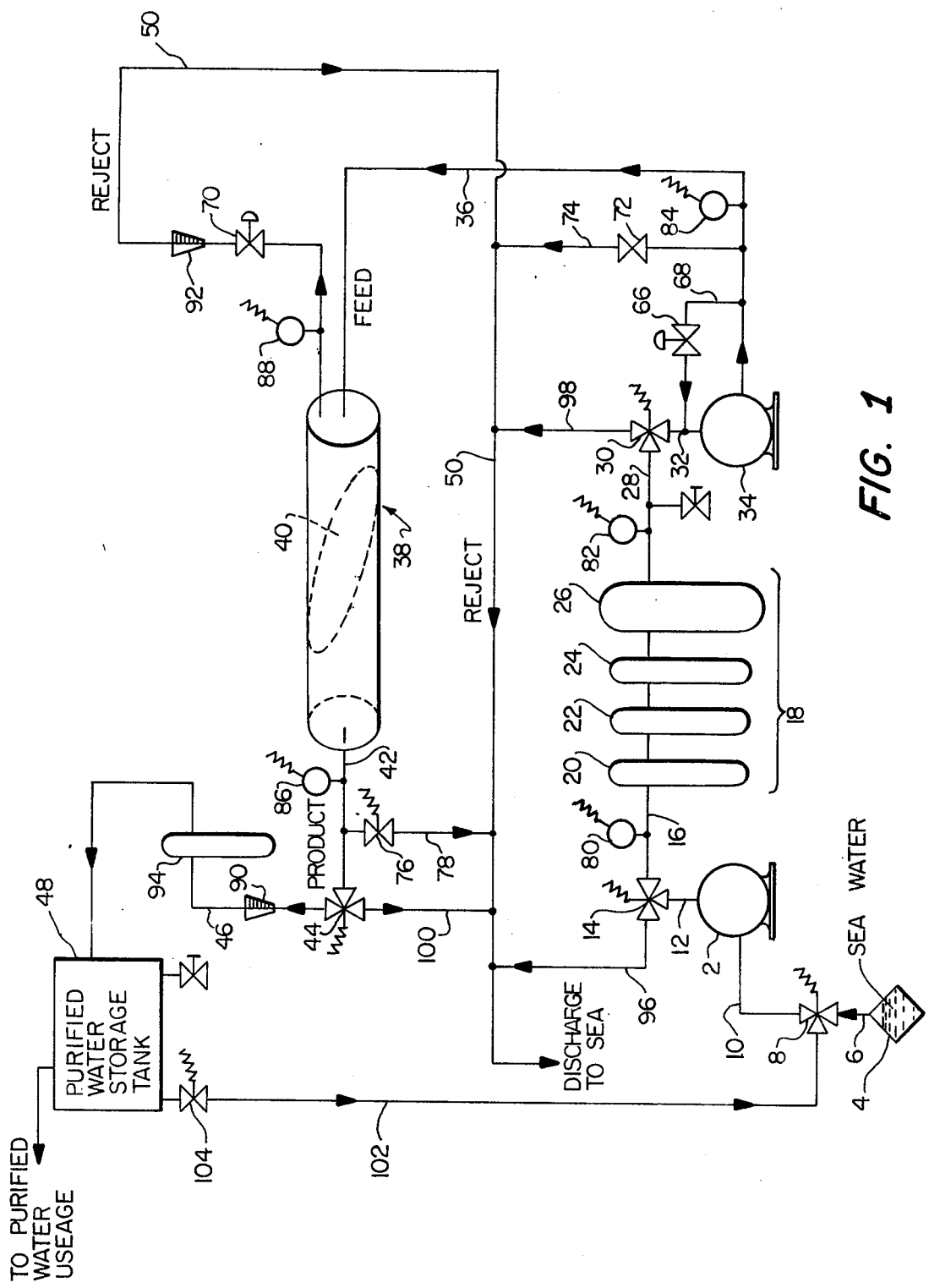
FIG. 1 is a schematic diagram illustrating the improved process and apparatus of the present invention for purifying sea water by reverse osmosis.

With reference to FIG. 1 of the drawings, the overall apparatus and process of the present invention will be described in more detail.

The important elements of the overall system of the present invention include a novel specifically configurated physical pretreatment installation for imparting a pretreatment to the sea water, a reverse osmosis unit or module, which may be of a known configuration, for purifying the sea water by reverse osmosis to remove substantially all of the dissolved salts therefrom, a low pressure pump for withdrawing sea water from the sea and for passing the sea water at a low pressure through the pretreatment installation, a high pressure pump for feeding the pretreated sea water to the reverse osmosis module at a high pressure, specifically located valves for maintaining desired operating parameters of the reverse osmosis purification operation, and a specific piping assembly connecting the above elements such that at each start-up of the system the first sea water drawn in by the low pressure pump, the first water pretreated by the physical pretreatment installation, and the first water purified by the reverse osmosis module may be rejected, and further such that at each shutdown of the system the entire system may be flushed with purified water and filled with such purified water during the period of shutdown.

More particularly, the system of the present invention includes a low pressure pump 2 which withdraws sea water from the sea at a low pressure. The sea water is passed through a strainer 4 to remove large debris and particles from the sea water. The sea water then passes from strainer 4 through pipe 6, three-way valve 8, pipe 10, low pressure pump 2, pipe 12, three-way valve 14, and pipe 16. The sea water is pumped by low pressure pump 2 from pipe 16 into physical pretreatment installation 18 which includes four separate physical filters 20, 22, 24 and 26, to be discussed in more detail below. The thus pretreated sea water passes through pipe 28, three-way valve 30, and pipe 32 to high pressure pump 34 which substantially increases the pressure of the sea water and passes the sea water through feed inlet pipe 36 to the feed inlet of permeator or reverse osmosis unit or module 38. The particular configuration of module 38 does not in and of itself form the present invention, and it is intended that the present invention be employable with any known or conventional such module. Basically however, module 38 operates in a manner such that the salt water feed is introduced into the module at a pressure greater than the osmotic pressure of the particular sea water involved. This causes the water to permeate through a semi-permeable membrane, shown schematically only at 40 in FIG. 1, by reverse osmosis.

The thus purified water is removed from the module via a purified product outlet. In accordance with the present invention such outlet connects to a purified product outlet pipe 42, and the purified water is passed through pipe 42, three-way valve 44, and pipe 46 into a purified water storage reservoir or tank 48. As the water permeates through semi-permeable membrane 40, substantially all of the dissolved salts in such water are prevented from passing through the membrane 40, in accordance with known reverse osmosis principles. Such salts are maintained on the upstream side of the membrane 40. There is constantly removed from the upstream side of membrane 40 a reject portion of the sea water, such reject portion having the dissolved salt concentration thereof increased by the salts which are prevented from passing through the membrane. Such reject portion is discharged from the module 38, at the end thereof adjacent the sea water feed inlet, and the reject portion is passed through reject pipe 50 for discharge back to the sea.

As indicated above, the particular configuration of the reverse osmosis module 38 does not in and of itself form a portion of the present invention. Rather, it is intended that the process and apparatus of the present invention be adapted to the use of any known and conventional reverse osmosis unit or module. However, one known type of reverse osmosis module 38 which has been found particularly useful for association with the process and apparatus of the present invention will now be described with reference to FIG. 2 of the drawings.

Specifically, the module 38 shown in FIG. 2 is a known module which has been described in literature by Du Pont and by Permo SA and which includes a hollow shell 52 having opposite ends thereof closed by end plates 54 and 56. Sea water is fed from inlet pipe 36 through end plate 54 into a longitudinal porous feed or distributor tube 58 which extends longitudinally through the shell 52. In accordance with this specific embodiment of the permeator or reverse osmosis module, the semi-permeable membrane is formed by a great plurality, for example approximately one million, elongated hollow fibers 60 which extend longitudinally of shell 52 and which fill the annular space between shell 52 and porous tube 58. The sea water is distributed radially outwardly through porous distributor tube 58 and fills the exterior spaces between the fibers 60. The walls of the fibers act as a semi-permeable membrane to allow the passage therethrough by reverse osmosis of the water, while preventing the passage therethrough of substantially all of the dissolved salts. Thus, the purified water collects in the interior hollow channels which extend longitudinally through each of the fibers and is passed from the ends of such fibers through a porous back-up disc 62 and then discharged through end plate 56 to purified water product pipe 42. The product discharge ends of fibers 60 may be bound and sealed by an epoxy sheet 64. The open ends of fibers 60 are shown in the enlarged portion of FIG. 2 of the drawings. The reject portion of the flow, having the salt concentration thereof increased, is discharged through a reject outlet to reject pipe 50.

The fibers 60 may be formed of any material which is known in the art to be capable of achieving reverse osmosis in accordance with known principles. One specifically preferred form of fibers 60 is Du Pont B-10 fibers specifically formed for use in reverse osmosis modules. Such B-10 fibers are formed of aromatic polyamids which are naturally stable, are non-biodegradable, and can be operated in water having pH values of from five to nine. Such known fibers have an outside diameter of approximately 84 microns and an inside diameter of approximately 40 microns.

It is specifically to be understood however that other conventional and known fiber configurations may be employed with fibers 60. It is further to be specifically understood that the present process and apparatus are equally employable in other known and conventional reverse osmosis units or modules.

One of the most important inventive concepts of the present invention is the specific configuration and manner of operation of the physical pretreatment installation 18. Specifically, installation 18 comprises four separate physical filters, and the sea water is passed seriatim through the physical filters 20, 22, 24 and 26 at a low pressure by low pressure pump 2. It has unexpectedly been found that the use of exactly four physical filters having specific pore sizes, to be discussed in more detail below, and operating under a particular low pressure, also to be discussed in more detail below, provides a vastly improved pretreatment of the sea water to avoid clogging of the module 38 during the primary treatment or purification of the sea water. More particularly, it has been found that the use of the specific pretreatment installation 18 in accordance with the present invention not only eliminates the need for a special chemical pretreatment of the sea water, but also maximizes the efficiency of the entire reverse osmosis apparatus.

As discussed above, it has unexpectedly been discovered that the use of four physical filters results in maximum performance. More than four filters may be employed, but there appears to be no operational advantage in using more than four filters, and the only apparent result is increasing the size and cost of the overall system. When fewer than four filters are employed, the results are not satisfactory, and specifically it has been found that clogging of module 38 is likely to occur.

Furthermore, it has unexpectedly been found that the pore sizes of filters 20, 22, 24 and 26 must decrease in size in the direction of flow of the sea water, and further that the pore sizes of each of the filters must be within specific ranges. More particularly, it has been found that the pore size of first filter 20 must be from 75 to 150 microns, and preferably 100 microns. It has further been found that the pore size of second filter 22 must be from 10 to 30 microns, and preferably 20 microns. Further, it has been found that the pore size of third filter 24 must be approximately 5 microns. Finally, it has critically been found that the pore size of the fourth and final filter 26 must be from 1 to 2 microns, and preferably 1 micron. It has particularly been found that this pore size limitation for fourth filter 26 is of great importance.

It is believed that those of ordinary skill in the art will understand that any of the various types of known commercially available filters may be employed as filters 20, 22, 24 and 26, as long as such known filters have the above discussed pore sizes. It has however specifically been found that conventional cartridge filters are most preferable. The construction of cartridge filters is very well known, and therefore will not be described or illustrated in further detail. The outer body of such cartridge filter must be a corrosion resistant material, such as stainless steel or polypropylene. Various materials may be employed for the internal filter material, however it has been found that very good efficiency and filtration accuracy are obtained when employing cotton as the internal filtering material. It will be further apparent that the overall size of the individual filters and the overall pretreatment installation 18, as well as the rate of flow therethrough will vary in accordance with the requirements of a specific installation, based on well known normal hydraulic design considerations.

It has further been found that an additional important parameter of the present invention is the pressure under which low pressure pump 2 operates. Specifically, it has been found that this pressure must be from 2 to 4 bars, and preferably 3 bars. A pressure of greater than 4 bars will substantially reduce the filtering efficiency of installation 18.

It is known that various oceans around the world have different degrees of salinity. Specifically, total salinity of the oceans varies from approximately 13,500 mg/l in the Caspian Sea to approximately 43,000 in the Persian Gulf. The average salinity of sea water throughout the world is however approximately 35,000 mg/l. The contents of the salinity of all sea water can however been broken down to generally include 90 weight percent sodium chloride, 2.6 to 2.8 weight percent sulfates, 1.2 to 1.4 weight percent calcium, 0.3 to 0.6 weight percent bicarbonates, and traces of iron. The pH range of sea water varies from 7.8 to 8.4.

A critical disadvantage of prior art systems for purifying sea water by reverse osmosis has been the heretofore unavoidable deposition of sulfates and carbonates (primarily calcium sulfate and calcium carbonate) on the semi-permeable membrane of the reverse osmosis module, thereby clogging or reducing the active surface area of the semi-permeable membrane. It has been discovered that a critical parameter controlling the deposition of such sulfates and carbonates, and particularly the deposition of calcium carbonate, is the concentration factor of the reject portion of the flow, i.e. the dissolved salt concentration in contact with the semi-permeable membrane.

In this regard, applicant has discovered that by maintaining a certain maximum dissolved salt concentration in the reject portion which is in contact with the semi-permeable membrane, it is possible to prevent the formation of deposited insoluble calcium carbonate, and calcium sulfates.

More particularly, applicant has discovered that by controlling the conversion level of the operation of the module it is possible to control the concentration of dissolved salts in the reject portion and to thus prevent the deposition and scale formation of sulfates and carbonates, particularly of calcium carbonate, in the module, and that such scale formation may be prevented without any need whatsoever of a chemical pretreatment of the sea water.

The conversion level (c.l.) is defined as:

$$c.l. \ (\%) = \frac{\text{Volume of Purified Water (100)}}{\text{Volume of Sea Water Fed to Module}}.$$

Thus, the concentration factor (c.f.) of a given reverse osmosis operation may be defined as:

$$c.f. = \frac{\text{Volume Feed}}{\text{Volume Feed} - \text{Volume Product}}.$$

It will of course be understood that the maximum conversion level and resultant maximum concentration factor of a given installation will vary somewhat, dependent upon the salinity of given sea water being purified. However, the following discussion is based upon the purification of sea water having an average salinity of 35,000 mg/l, as discussed above.

Specifically, when purifying sea water having an average salinity as discussed above, the conversion level should be maintained to be from 5 to approximately 11%. A specifically preferred conversion level is 10%. If the conversion level is over 12%, applicant has discovered that calcium carbonate and sulfates will form scales in the module, and specifically on the semi-permeable membrane. Thus, with conversion levels over 12%, it is necessary to employ a chemical pretreatment of the sea water. Applicant has further discovered that at conversion levels of below 5% there will result in an erosion of the semi-permeable membrane due to the relatively high speed of flow of the reject portion. Accordingly, and when purifying sea water having a salinity of approximately 35,000 mg/l, the concentration factor is maintained at a maximum of approximately 1.12.

It must again be emphasized that a critical concept of the present invention involves the combined use of the above described physical pretreatment installation 18 having the specifically above described configuration with the control of the conversion level, and thus the concentration factor, of the operation of the reverse osmosis module 38. The combined use of these two novel and unique features in accordance with the present invention makes it possible to purify sea water to form purified and potable water without any need whatsoever for a chemical pretreatment of the sea water, and without the deposition on the semi-permeable membrane of the reverse osmosis module. The formation of such deposits on the semi-permeable membrane would necessitate cleaning the module at short intervals and would thus greatly reduce the flexibility and desirability of the system.

It is generally known in the art that the conversion level, and therefore the concentration factor, is controlled in direct proportion to the pressure of the salt water being fed to the module. Such pressure, as is also known, generally varies as a function of temperature of the sea water and salt concentration of the sea water. Thus, the higher the temperature, the lower must be the pressure to obtain a given conversion level. Also, the higher the salt concentration of the sea water, the higher must be the pressure to obtain a given conversion level. In accordance with the present invention, to maintain the above discussed conversion levels, the pressure of the salt water feed, as supplied by high pressure pump 34, must be 45 to 60 bars. However, as will be apparent from the above discussion, the specific high pressure employed must be that pressure capable of ensuring the desired conversion level within the above limits.

In accordance with the present invention, the feed pressure, the conversion level and thus the concentration factor are controlled, not only by high pressure pump 34, but also by a bypass valve 66 located in a bypass pipe 68 extending between the outlet and the inlet of high pressure pump 34, and additionally by a flow control valve 70 located in reject flow pipe 50. It is believed to be readily apparent that a systematic control of valves 66 and 70 will clearly regulate the pressure of the feed into the module, and thereby the conversion level and concentration factor.

Additionally, the system of the present invention may be provided with otherwise known safety and monitoring equipment to prevent damage to the system. For example, safety valve 72 may be provided in safety bypass pipe 74 extending from high pressure feed pipe 36 to reject pipe 50. Similarly, safety valve 76 may be provided in safety bypass pipe 78 leading from purified water outlet pipe 42 to reject pipe 50.

Also, pressure gauges 80 and 82 may be provided on the upstream and downstream, respectively, sides of physical pretreatment installation 18, such that if the differential pressure upstream and downstream of installation 18 varies outside a predetermined range, then gauges 80 and 82 may operate in an otherwise conventional and known manner to shut down low pressure pump 2. Similarly, pressure gauge 84 on the upstream side of module 38 and pressure gauges 86 and 88 on downstream sides of module 38 may be provided to shut down high pressure pump 34 upon the detection of a pressure differential between upstream and downstream sides of module 38, as an indication of clogging of the semi-permeable membrane.

Such detection may be complemented by the provision of flow meters 90 and 92.

In accordance with an additional feature of the present invention, an activated carbon filter 94, of known configuration, may be provided in purified water outlet pipe 46 to remove from such purified water any traces of halogenaceous or organic elements which are likely to impart an undesirable taste to the purified water.

In accordance with a still further feature of the present invention, it is possible to operate three-way valve 14 such that pipe 12 is connected to reject pipe 50 via pipe 96, while closing connection of pipe 12 to pipe 16. Similarly, three-way valve 30 is operable such that pipe 28 is connected to reject pipe 50 via pipe 98, while blocking connection of pipe 28 to pipe 32. Further similarly, three-way valve 44 is selectively operable to connect product outlet pipe 42 with reject pipe 50, while blocking connection of pipe 42 with pipe 46.

By the above arrangements, it is possible during start-up of the system to systematically reject to the sea the first sea water sucked into the system by low pressure pump 2, the first water passed through physical pretreatment installation 18, and the first water passed through the reverse osmosis module 38. More particularly, by operating three-way valve 8 such that pipe 6 is connected to pipe 10, and by operating three-way valve 14 such that pipe 12 is connected to pipe 96, then it will be apparent that the water sucked into the system by low pressure pump 2 will pass from strainer 4, through pipe 6, valve 8, pipe 10, pump 2, pipe 12, valve 14, pipe 96, and reject pipe 50 to be discharged to the sea. Similarly, by thereafter operating three-way valve 14 such that pipe 12 is connected to pipe 16, and by adjusting three-way valve 30 such that pipe 28 is connected to pipe 98, then the first sea water which is filtered by the separate filters 20, 22, 24 and 26 of physical pretreatment installation 18 will be passed via pipe 28, valve 30, and pipe 98 to reject pipe 50 to then be discharged to the sea. Even further, by thereafter adjusting three-way valve 30 such that pipe 28 is connected to pipe 32, and by adjusting three-way valve 44 such that pipe 42 is connected to pipe 100, the first water purified by reverse osmosis module 38 will pass through pipe 42, valve 44, and pipe 100 to reject pipe 50 to then be discharged to the sea.

By the above operations, it is possible to completely flush out the entire system at each start-up of the system.

In accordance with a further important inventive feature of the present invention, there is provided means for, at each shutdown of the system, flushing the entire system with purified water from purified water storage tank 48 and for filling the entire system with such purified water during the entire length of shutdown of the system.

More particularly, a pipe 102 has therein a shutoff valve 104 and extends from storage tank 48 to three-way valve 8. Thus, by selective operation of three-way valve 8 to connect pipe 102 with pipe 10, and to thereby disconnect pipe 6 from pipe 10, and by opening shutoff valve 104, it is possible to feed purified water from storage tank 48 into the entire system of the present invention. Such purified water may be employed, initially at shutdown of the system, to flush the entire system by selective operation of the above discussed various three-way valves. After such flushing operation, the purified water from storage tank 48 may be passed through pipe 102 to completely fill the entire system.

The above flushing and filling of the system with purified water during the entire shutdown period operates to prevent corrosion of any of the metal components of the system with sea water, operates to dissolve any initial scale formation of calcium carbonate or calcium sulfate which may have formed on the semi-permeable membrane of module 38, and operates to remove any colloidal deposits from the semi-permeable membrane of module 38. Additionally however, such flushing and filling of the entire system with purified water provides an even more important and novel advantage of the present invention. Specifically, such flushing and filling results in the system being filled with a medium (i.e. the purified water) which has a very low osmotic pressure and which thus constitutes a medium which is biocidal to and prevents the growth of marine microorganisms which might otherwise grow within the system. It is thus possible to prevent the growth of marine microorganism with the system, and this eliminates the need for a chemical cleaning agent.

In accordance with an additional feature of the present invention, it has been found that the above described process and apparatus operate to remove any natural or artificial radioactive elements consisting of monovalent or plurivalent metal contaminants which may be present in the sea water. Thus, the system of the present invention provides a further unique function in providing purified and potable water. The removal of such radioactive contaminants is achieved by the normal operation of the reverse osmosis module.

Sea water along coasts has a composition which is unacceptable for treatment by the process and apparatus of the present invention. Specifically, sea water along coasts is highly loaded, not only naturally on a physical level by plant debris, silt, colloids, etc., but also by man-made pollutants, for example bacteria, viruses, hydrocarbons, detergents, biocides, and toxic salts resulting from human activity. This high level of natural and man-made pollution represents too high a level of pollution to be successfully treated by a reverse osmosis, without the use of strong chemical pretreatment. However, the effects of this heavy pollution in the sea water normally disappear within approximately five nautical miles from shore, and at such distance from coastlines the sea water recovers its normal physical composition, as discussed above. Thus, the process and apparatus of the present invention are intended to be employed in offshore locations, such as ships, offshore drilling rigs, laboratory platforms, etc. By use of the process and apparatus of the present invention on structures located at least approximately five nautical miles from coastlines, and by maintaining the above critical operational features and parameters of the present invention, it is possible to ensure that sea water having a fouling power of no more than approximately three comes in contact with the semi-permeable membrane of the reverse osmosis unit. The term "fouling power" is an art recognized term referring to the measure of clogging of the membranes of a reverse osmosis module, and it is generally recognized that a fluid having a fouling power of no more than four is satisfactory for reverse osmosis semi-permeable membranes.

It is further known that the iron content in normal sea water is only approximately 0.02 mg/l, and this level is below that concentration which would result in the formation of precipitates in the presence of oxygen. Therefore, the process and apparatus of the present invention need normally not provide means for eliminating iron from the sea water. It is however to be understood that the various elements of the apparatus of the present invention must be formed of a material which will not add iron to the sea water. Specifically, the elements of the present invention which come in contact with the sea water should be formed of a corrosion resistant material, for example a corrosion resistant alloy, a suitable corrosion resistant plastic material, marine bronze, etc. This requirement particularly holds true for elements such as strainer 4, low pressure pump 2, and high pressure pump 34, as well as the other elements of the apparatus of the invention.

Additionally, it is to be understood to be within the scope of the present invention that the operation of the various elements of the present invention may be automatically controlled by a control cabinet or console of known type and construction. Specifically, the operation of pumps 2 and 34, of three-way valves 8, 14, 30 and 44, of shutoff valve 104, and of pressure gauges 80, 82, 84, 86 and 88 may be automatically controlled by conventional circuitry to provide for automatic initiation and control of the above described operational sequences of the present invention. Further, such automatic controls may regulate the automatic start-up and shutdown of the system of the present invention, for example as a function of the level of purified water in storage tank 48. For example, storage tank 48 could be provided with electric level indicators for detecting minimum and maximum purified water levels, and for initiating automatic start-up and shutdown of the system of the invention as a function of such levels. The control circuitry for achieving such automatic control and regulation of the process and apparatus of the present invention is not described herein in detail, since the provision and design of such control circuitry and equipment would be readily understood by one of ordinary skill in the art. It is however to be understood that the scope of the present invention includes the provision of such automatic control circuitry and equipment as to automatically control the sequence, duration and chronological order of all of the above discussed operations of the present invention.

It is further intended to be within the scope of the present invention that the system shown in FIG. 1 could include plural modules 38. Specifically, the scope of the present invention is intended to include plural modules 38 connected in parallel, such that purified water may be simultaneously obtained from plural modules, or alternatively such that a standby module or modules could be brought into operation if a given module has to be shut down for purposes of repair or cleaning.

Although the present invention has been described above with regard to specific process steps and structural features, it is to be understood that various modifications may be made thereto without departing from the scope of the invention.

What I claim is:

1. A process for purifying sea water to form potable water, said process comprising:

withdrawing sea water from the sea;

passing the thus withdrawn sea water at a low pressure through at least four plural-stage physical filters having decreasing degrees of porosity, taken in the direction of flow of said sea water, thereby filtering suspended particles and colloids from said sea water;

providing at least one reverse osmosis module including therein at least one semi-permeable membrane having an upstream side and a downstream side, a sea water feed inlet extending into said module on said upstream side of said membrane, a reject outlet leading from said module on said upstream side of said membrane, and a purified water outlet leading from said module on said downstream side of said membrane;

feeding the sea water filtered by said plural filters into said feed inlet of said module at a high pressure higher than the osmotic pressure of said sea water;

causing a first volume portion of said sea water to pass by reverse osmosis through said membrane to said downstream side of said membrane, said membrane preventing the passage therethrough of substantially all of the dissolved salts in said first volume portion, thereby removing said dissolved salts from said first volume portion and forming said first volume portion into purified potable water, whereby said dissolved salts removed from said first volume portion are added to a second volume portion of said sea water remaining on said upstream side of said membrane, thus increasing the dissolved salt concentration of said second volume portion and forming a reject flow;

removing said purified potable water from said module through said purified water outlet;

removing said reject flow from said module through said reject outlet;

controlling the conversion level of said module at a value to prevent the formation on said membrane of sulfates and carbonates, wherein:

$$\text{conversion level (\%)} = \frac{\text{Volume of Purified Water (100)}}{\text{Volume of Sea Water Fed to Module}};$$

passing said purified potable water removed from said module to a fresh water storage tank; and upon shutdown of the system, flushing the entire system with purified potable water from said fresh water storage tank, and maintaining said entire system filled with said purified potable water during the entire time of shutdown of said system, whereby said purified potable water, due to the low osmotic pressure thereof, forms a medium which is biocidal to and prevents the growth of marine microorganisms within said system.

2. A process as claimed in claim 1, wherein said low pressure comprises from 2 to 4 bars.

3. A process as claimed in claim 1, wherein said low pressure comprises 3 bars.

4. A process as claimed in claim 1, wherein said sea water is passed seriatim through only four separate physical filters.

5. A process as claimed in claim 4, wherein the first said filter has a pore size of from 75 to 150 microns.

6. A process as claimed in claim 4, wherein the first said filter has a pore size of 100 microns.

7. A process as claimed in claim 4, wherein the second said filter has a pore size of from 10 to 30 microns.

8. A process as claimed in claim 4, wherein the second said filter has a pore size of 20 microns.

9. A process as claimed in claim 4, wherein the third said filter has a pore size of approximately 5 microns.

10. A process as claimed in claim 4, wherein the fourth said filter has a pore size of approximately from 1 to 2 microns.

11. A process as claimed in claim 4, wherein the fourth said filter has a pore size of 1 micron.

12. A process as claimed in claim 1, wherein said high pressure comprises from 45 to 60 bars.

13. A process as claimed in claim 1, wherein said conversion level is controlled to be from approximately 5 to 11%.

14. A process as claimed in claim 1, wherein said conversion level is controlled to be approximately 10%.

15. A process as claimed in claim 1, wherein said conversion level is controlled by adjusting the pressure of said sea water fed into said feed inlet of said module while continuing said step of feeding said sea water into said feed inlet, and by adjusting the pressure of said reject flow removed from said module through said reject outlet.

16. A process as claimed in claim 1, wherein said sea water contains radioactive contaminants, and further comprising removing said radioactive contaminants from said first volume portion by passage thereof through said membrane.

17. A process as claimed in claim 1, wherein said purified potable water removed from said module is passed through an activated carbon filter before being passed to said fresh water storage tank.

18. A process as claimed in claim 1, further comprising, upon the start-up of the system, discharging the initial volume of sea water withdrawn from the sea, thereafter separately discharging the initial volume of sea water passed through said plural physical filters, and thereafter separately discharging the intial volume of water purified by said reverse osmosis module.

19. An apparatus for purifying sea water to form potable water, said apparatus comprising:
means for withdrawing sea water from the sea;
at least four separate plural physical filters each having different porosities;
low pressure pump means for passing said sea water at a low pressure seriatim through said plural filters in order from the most porous to the least porous;
at least one reverse osmosis module including therein at least one semi-permeable membrane having an upstream side and a downstream side, a sea water feed inlet extending into said module on said upstream side of said membrane, a reject outlet leading from said module on said upstream side of said membrane, and a purified water outlet leading from said module on said downstream side of said membrane;
high pressure pump means for feeding the sea water filtered by said plural filters into said feed inlet of said module at a high pressure higher than the osmotic pressure of said sea water, thereby causing a first volume portion of said sea water to pass by reverse osmosis through said membrane to said downstream side of said membrane, said membrane preventing the passage therethrough of substantially all of the dissolved salts in said first volume portion, thereby removing said dissolved salts from said first volume portion and forming said first volume portion into purified potable water, whereby said dissolved salts removed from said first volume portion are added to a second volume portion of said sea water remaining on said upstream side of said membrane, thus increasing the dissolved salt concentration of said second volume portion and forming a reject flow;
means for removing said purified potable water from said module through said purified water outlet;
means for removing said reject flow from said module through said reject outlet;
means for controlling the conversion level of said module at a value to prevent the formation on said membrane of sulfates and carbonates, wherein:

$$\text{conversion level } (\%) = \frac{\text{Volume of Purified Water (100)}}{\text{Volume of Sea Water Fed to Module}};$$

a fresh water storage tank connected to said purified water outlet for storage of said purified potable water; and
means for, upon shutdown of said entire apparatus, flushing said filters, said low pressure pump means, said high pressure pump means, and said reverse osmosis module with purified potable water from said fresh water storage tank, and for maintaining said entire apparatus filled with said purified potable water during the entire time of shutdown of said apparatus.

20. An apparatus as claimed in claim 19, wherein said low pressure comprises from 2 to 4 bars.

21. An apparatus as claimed in claim 19, wherein said low pressure comprises 3 bars.

22. An apparatus as claimed in claim 19, comprising only four separate physical filters.

23. An apparatus as claimed in claim 22, wherein the first said filter has a pore size of from 75 to 150 microns.

24. An apparatus as claimed in claim 22, wherein the first said filter has a pore size of 100 microns.

25. An apparatus as claimed in claim 22, wherein the second said filter has a pore size of from 10 to 30 microns.

26. An apparatus as claimed in claim 22, wherein the second said filter has a pore size of 20 microns.

27. An apparatus as claimed in claim 22, wherein the third said filter has a pore size of approximately 5 microns.

28. An apparatus as claimed in claim 22, wherein the fourth said filter has a pore size of approximately from 1 to 2 microns.

29. An apparatus as claimed in claim 22, wherein the fourth said filter has a pore size of 1 micron.

30. An apparatus as claimed in claim 19, wherein said high pressure comprises from 45 to 60 bars.

31. An apparatus as claimed in claim 19, wherein said controlling means controls said conversion level to be from approximately 5 to 11%.

32. An apparatus as claimed in claim 19, wherein said controlling means controls said conversion level to be approximately 10%.

33. An apparatus as claimed in claim 19, wherein said controlling means comprises a first valve means for adjusting the pressure of said sea water fed into said feed inlet of said module while continuing operation of said high pressure pump means, and second valve means for adjusting the pressure of said reject flow removed from said module through said reject outlet.

34. An apparatus as claimed in claim 19, wherein said sea water contains radioactive contaminants, and said membrane comprises means for removing said radioactive contaminants from said first volume portion.

35. An apparatus as claimed in claim 19, further comprising an activated carbon filter between said purified water outlet and said fresh water storage tank.

36. An apparatus as claimed in claim 19, further comprising means for, upon the start-up of said apparatus, discharging the initial volume of sea water passed through said low pressure pump means, thereafter separately discharging the initial volume of sea water passed through said plural physical filters, and thereafter separately discharging the initial volume of water purified by said reverse osmosis module.

37. A process as claimed in claim 15, wherein said pressure of said sea water fed into said feed inlet is adjusted by varying the amount of said sea water fed to said feed inlet.

38. An apparatus as claimed in claim 33, further comprising a bypass pipe bypassing said high pressure pump means, said first valve means being located in said bypass pipe.

* * * * *